Sept. 28, 1965   M. BAERMANN   3,208,296
BELT DRIVE DEVICE
Filed Dec. 28, 1962
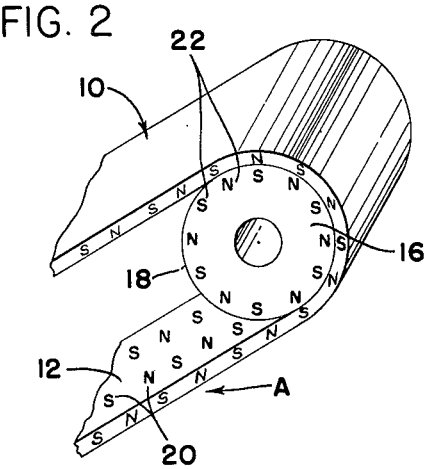
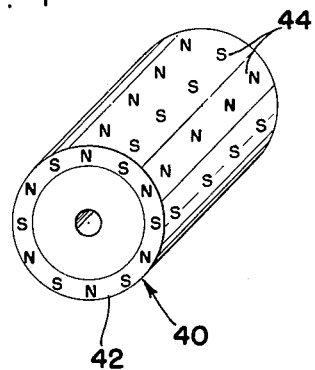
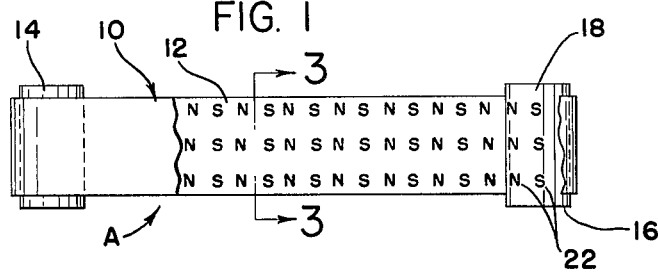
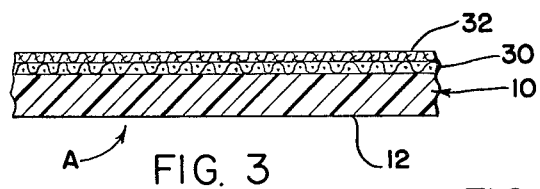
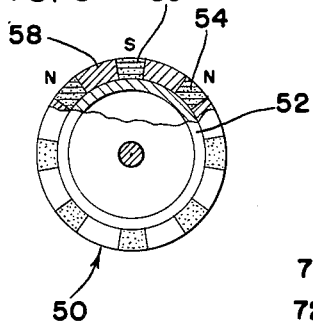
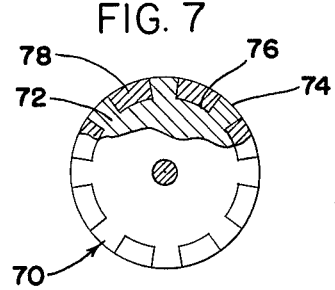
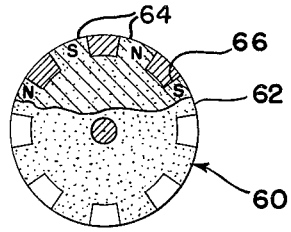
INVENTOR.
MAX BAERMANN
BY *Tilberry and Body*
ATTORNEYS United States Patent Office 3,208,296
Patented Sept. 28, 1965

3,208,296
BELT DRIVE DEVICE
Max Baermann, Bensberg Wulfshof,
Bezirk Cologne, Germany
Filed Dec. 28, 1962, Ser. No. 248,126
Claims priority, application Germany, Apr. 26, 1962,
B 66,978
13 Claims. (Cl. 74—229)

The present invention pertains to the art of mechanical drive devices of the type adapted to transmit rotary motion from one member to another and more particularly to such a drive device which incorporates a flexible belt.

The invention is particularly applicable to a drive device wherein a flexible belt extends between two rotatable pulleys and the invention will be discussed with reference thereto; however, it is to be appreciated that the invention has much broader applications and may be used in various devices for transmitting force by a flexible member, such as a belt.

Basically, the invention concerns a device consisting of two spaced pulleys which are drivingly connected by an endless belt. In such devices, one of the pulleys is usually connected to a driving shaft and the other pulley is connected to a driven shaft which may operate various rotary components. In the past, these drive devices have usually been operated solely by the frictional engagement between the endless belt and the outer periphery of the pulleys so that they could transmit only a limited amount of torque for a given pulley size. The amount of torque and, thus, the power which could be transmitted over such a pulley drive device was limited by the coefficient of friction between the inner surface of the endless belt and the outer surface, or periphery, of the rotatable pulleys. In order to increase the frictional force between the pulleys and the belt, it was necessary to provide appropriately positioned idler pulleys for placing the endless belt under tension or specially prepared adhesives which would increase the coefficient of friction between the inner surface of the belt and the outer periphery of the rotatable pulleys. Even with these and other innovations of the endless belt drive device, a certain amount of slippage was still present and the maximum transmittable torque was still quite limited.

When the endless belt drive devices were used for high speed installations, it was found that the endless belt tended to move radially outward from the periphery of the pulleys due to the high centrifugal forces exerted on the belt as it passes around the circumference of the pulleys. As the endless belt shifted outwardly from the periphery of the pulleys, a considerable amount of slippage was allowed and the belt drive device could transmit a lesser amount of power. Consequently, as the rotational speed of the pulleys increased, the transmittable power of the drive device correspondingly decreased.

Some of the difficulties encountered in a friction type of endless belt drive device can be obviated by utilizing a chain drive which allows power transmission free from slippage. However, a chain cannot be conveniently used when the distance between the driven and driving shafts is relatively long or when high speed operation is required. To overcome the disadvantages inherent in a chain drive device, it has become known to use a belt having a serrated inner surface which is in mesh with a geared wheel or sprocket with grooves that correspond in pitch with the serrations on the belt. This type of drive device prevents silppage; however, it is subject to a considerable amount of wear during use and, when high speed operation is required, this arrangement is inapplicable. All of these positive driving arrangements between two rotating members have the further disadvantage that they create a substantial amount of background noise that is undesirable in certain situations.

The present invention contemplates an endless belt drive device which overcomes the above-mentioned difficulties and others and which is positive in operation, noiseless, and inexpensive to manufacture.

In accordance with the present invention there is provided, in the combination of a pulley having an outer surface and an elongated flexible belt having a surface drivingly engaging the peripheral surface of the pulley wherein the pulley surface is ferro-magnetic and the belt surface has a plurality of pairs of north and south permanent magnetic poles.

In accordance with another aspect of the present invention, the above-mentioned belt is formed, at least adjacent the inner surface thereof, of a flexible material having finely divided permanently magnetized material dispersed therein.

In accordance with still another aspect of the present invention there is provided, in the combination of a pulley having an outer surface and an endless belt having an inner surface drivingly engaging said outer surface, the improvement comprising: said pulley outer surface having equally spaced, alternate north and south magnetic poles, said belt inner surface having alternate north and south magnetic poles equally spaced along the inner surface in the direction of movement of the belt over the pulley, and the magnetic poles on the belt having substantially the same pitch at the magnetic poles on the pulley.

The primary object of the present invention is the provision of an endless belt drive device wihch is inexpensive to manufacture, positive in operation and adapted for high speed use.

Still another object of the present invention is the provision of an endless belt drive device which is inexpensive to manufacture and is effective for both large and small installations.

Another object of the present invention is the provision of an endless belt drive device which uses an endless belt having no interlocking surface protrusions and which is still positive in operation.

Yet another object of the present invention is the provision of an endless belt drive device which comprises a pulley having an outer surface and an endless belt having an inner surface drivingly engaging the outer surface of the pulley, wherein the pulley outer surface is formed from a ferro-magnetic material and there are provided pairs of north and south permanent magnetic poles on the inner surface of the belt.

Another object of the present invention is the provision of an endless belt drive device which utilizes an endless belt having north and south magnetic poles spaced along its inner surface to cause positive engagement between the belt and a pulley over which the belt rides.

Still another object of the present invention is the provision of an endless belt drive device which utilizes an endless belt having an inner pulley engaging surface formed of a flexible material having finely divided permanently magnetizable material dispersed therein.

These and other objects and advantages will become apparent from the following description used to illustrate the preferred embodiment of the invention as read in connection with the accompanying drawing in which:

FIGURE 1 is a somewhat schematic, partially cut-away view illustrating a preferred embodiment of the present invention;

FIGURE 2 is a partial, enlarged perspective view of the embodiment shown in FIGURE 1;

FIGURE 3 is a cross-sectional view taken generally along line 3—3 of FIGURE 1;

FIGURE 4 is a perspective view illustrating a modification of the preferred embodiment shown in FIGURES 1 and 2; and FIGURES 5–7 are further modifications of the preferred embodiment illustrated in FIGURES 1 and 2.

Referring now to the drawings, wherein the showings are for the purpose of illustrating preferred embodiments of the invention only and not for the purpose of limiting same, FIGURE 1 shows an endless belt drive device A of the type adapted to transmit a rotational movement from one shaft to another. In accordance with the preferred embodiment of the present invention, the endless belt drive device A comprises an endless belt 10 having an inner surface 12 and entrained around spaced rotatable pulleys 14, 16 which pulleys are adapted to rotate on substantially parallel axes and have outer surfaces drivingly engaged with the inner surface 12. In accordance with the preferred embodiment of the present invention as shown in FIGURES 1 and 2, the inner surface 12 of endless belt 10 is provided with alternate polarity equally spaced magnetic poles 20. The endless belt 10 is flexible in a transverse direction; therefore, the provision of plural closely spaced north and south magnetic poles on one surface of the belt without interrupting the continuity of the surface, requires construction of the endless belt of a flexible material which can be permanently magnetized. In accordance with the present invention, the endless belt 10, at least adjacent the inner surface 12 is formed from a flexible non-magnetic material having finely divided permanently magnetizable material dispersed therein. This permanently magnetizable material has a high coercive field strength of more than 1,000 oersteds and a low permeability. The iron ferrites with one or more of the metallic oxides of barium, strontium or lead are especially adapted for use as the finely divided permanently magnetizable material; however, it is appreciated that other permanent magnetic materials having similar magnetic properties may be included such as bismuth-manganese and the like.

To coact with the equally spaced north and south magnetic poles 20 on the inner surface 12, the outer surfaces 18 of pulleys 14, 16 are provided with a plurality of axially extending alternate polarity north and south magnetic poles 22. The spacing between adjacent north and south magnetic poles is substantially the same as the spacing between north and south magnetic poles along the length of endless belt 10 so that as the belt travels around the periphery of the pulley, the poles on the belt will be aligned with the poles on the pulley. Since pulleys 14, 16 are substantially identical, further discussion of the invention will refer only to pulley 16; however, it is appreciated that this discussion will apply equally to pulley 14. Since the pulley 16 need not be flexible, a non-flexible permanent magnetic material may be used to construct the pulley and axially extending poles 22 may be provided by appropriate magnetization of the outward portion of pulley 16.

The operation of the preferred embodiment of the invention, as shown in FIGURES 1 and 2, is substantially the same as an endless chain extending between two rotatably mounted sprockets. In other words, as the belt 10 rides over the pulleys 14, 16 the poles on inner surface 12 align with opposite polarity poles on surface 18 of the pulleys. This provides a magnetic locking force between the belt and the pulley in a manner similar to the teeth and links of a pulley and chain without requiring the complicated mechanism of a chain. Since the poles are equally spaced, or have an equal pitch, on the pulleys and the belt, continued operation of the endless belt brings different sets of belt and pulley poles into locking engagement. The magnetic force between the belt and pulley determines the amount of torque which can be transmitted by the device A.

In the endless belt drive device A as shown in FIGURES 1 and 2, the transmission of power by friction is of ancillary importance and is even undesirable in most situations. It is primarily the magnetic coupling between the belt and pulleys which affords the transmission of mechanical power between pulleys 14, and 16. Special measures for increasing the frictional resistance such as appropriately positioned idler pulleys or specially prepared adhesives are not necessary. Since a magnetic coupling is provided between the belt and the pulleys, this drive arrangement can function properly while submerged in oil which is a substantial benefit for certain uses.

Referring now to FIGURE 3, the endless belt 10 which, in accordance with the preferred embodiment of the invention, is formed primarily of a flexible material such as polyvinyl chloride or rubber having an appropriate amount of finely divided permanently magnetizable particles such as barium ferrite dispersed therein, especially adjacent surface 12, would be flexible in an axial as well as a transverse direction. The transverse flexibility of the endless belt 10 is necessary so that the belt can be entrained around the pulleys 14, 16; however, any flexibility in the axial direction is not desirable because the distance between poles 20, or the pitch of the poles, should be maintained substantially constant so that they will align properly with poles 22 on the pulleys. Accordingly, in accordance with the preferred embodiment of the present invention, the endless belt 10 is provided with a restraining means for preventing axial stretching of the belt 10. As shown in FIGURE 3, this restraining means take the form of a metal screen 30 embedded within the material forming belt 10 and covered by a fabric layer 32 which may be embedded within the belt material or adhered thereto. By this arrangement, axial stretching of belt 10 is substantially prevented.

Referring now to FIGURE 4, there is illustrated a modification of the pulleys 14, 16 wherein pulley 40 is provided with an outer layer 42 which layer is formed from a flexible material having finely divided permanently magnetizable particles dispersed therein which particles have a coercive force of at least 1,000 oersteds and a low permeability. Thus, the layer 42 is formed of a material substantially identical to the material used in the preferred embodiment of belt 10. The layer 42 is provided with axially extending poles 44 which are spaced, in accordance with the preferred embodiment of the invention, a distance equal to the spacing of the magnetic poles on belt 10. As in the case of belt 10 and pulleys 14, 16, the poles 44 extend transversely across the layer 42.

Referring now to FIGURE 5, pulley 50 is a further modification of pulleys 14, 16 as shown in FIGURES 1 and 2. This pulley comprises a central ferro-magnetic hub 52 having secured onto the periphery thereof a plurality of north magnetic poles 54 and south magnetic poles 56 which poles are alternately positioned and equally spaced around hub 52. Between the poles 54, 56 there is provided, in accordance with this embodiment of the invention, a non-magnetic, low permeability insert 58 which separates the poles 54, 56. By producing the magnetic poles 54, 56 of a magnetic alloy insert, a substantial field strength can be obtained and the poles 20 of belt 10 will be securely locked onto the pulley 50 while the belt is riding on the periphery of the pulley.

Referring now to FIGURE 6, still a further modification of pulleys 14, 16 is illustrated. Pulley 60 comprises a hub 62 constructed of a permanent magnetic alloy and having radially extending pole pieces 64 separated by an appropriate groove 66. The pole pieces 64 are magnetized with circumferentially alternating polarities. The groove 66, in accordance with this embodiment of the invention, is filled with a non-magnetic low permeability material to provide a smooth outer periphery on the pulley.

Referring now to FIGURE 7, a modification of pulley 60 is illustrated wherein pulley 70 comprises a hub 72 constructed of a high permeability ferro-magnetic material such as soft iron. Spaced around the outer periphery of hub 72 are a plurality of pole pieces 74 which are not magnetized because the material of hub 72 has a low retentivity. Between adjacent pole pieces 74 there is provided a groove 76 which is filled with an appropriate non-magnetic, low permeability insert 78. As belt 10 passes over pulley 70, the poles 20 will be magnetically coupled onto the pole pieces 74. Of course, the coupling of belt 10 onto pulley 70, under like conditions, will be substantially less than the coupling between belt 10 and the other pulleys wherein permanent magnetic poles are provided thereon.

The present invention has been discussed in connection with a number of preferred embodiments and it is appreciated that various structural changes in these embodiments may be made without departing from the intended spirit and scope of the invention as defined in the appended claims.

Having thus described my invention, I claim:

1. In the combination of a pulley having a peripheral surface and a flexible belt having a surface drivingly engaging said peripheral surface, the improvement comprising: said pulley surface being ferro-magnetic and said belt surface having pairs of north and south permanent magnetic poles extending laterally across said belt, said poles being spaced from each other in a longitudinal direction.

2. The improvement as defined in claim 1 wherein said belt comprises a mixture of a flexible binder and finely divided permanently magnetized particles dispersed therein with said particles being magnetized to form said permanent magnet poles.

3. The improvement as defined in claim 2 wherein said particles are selected from the class consisting of barium ferrite, strontium ferrite, lead ferrite, bismuth manganese and mixtures thereof.

4. The improvement as defined in claim 2 wherein said particles have a coercive field strength of more than a 1,000 oersteds and a low permeability in the range of unity.

5. The improvement as defined in claim 1 wherein said ferro-magnetic surface of said pulley is magnetized with alternate north and south magnetic poles extending axially of said pulley surface, each of said magnetic poles on said pulley being equally spaced in a circumferential direction from adjacent poles thereon, said north and south magnetic poles on said belt being alternately positioned and spaced in a longitudinal direction from each other the same distance as said poles on said pulley surface.

6. The improvement as defined in claim 5 wherein said ferro-magnetic surface of said pulley comprises an outer layer of flexible binder with finely divided permanently magnetizable particles dispersed therein.

7. The improvement as defined in claim 1 wherein said pulley surface comprises a high permeability material.

8. The improvement as defined in claim 7 wherein said north and south permanent magnetic poles are equally spaced along said belt and said pulley surface is provided with pole pieces separated by non-magnetic inserts, said pole pieces being spaced from each other a distance equal to the spacing of said permanent magnetic poles on said belt.

9. In the combination of a pulley having an outer surface and an endless belt having an inner surface drivingly engaging said outer surface, the improvement comprising: said pulley outer surface being ferro-magnetic and permanent magnetic poles of alternate polarity, equally spaced along said belt inner surface in the direction of movement of said belt over said pulley.

10. The improvement as defined in claim 9 wherein said belt comprises a mixture of a flexible binder and finely divided permanently magnetizable particles dispersed therein with said particles being magnetized to form said permanent magnet poles.

11. In the combination of a pulley having an outer surface and an endless belt having an inner surface drivingly engaging said outer surface, the improvement comprising: said pulley outer surface having equally spaced, alternate north and south magnetic poles, said belt inner surface having alternate north and south magnetic poles equally spaced along said inner surface in the direction of movement of said belt over said pulley, and said poles on said belt having the same pitch as poles on said pulley.

12. In the combination of a pulley having a peripheral surface and a flexible belt having a surface drivingly engaging said peripheral surface, the improvement comprising: the peripheral surface of said pulley comprising axially extending, elongated magnets with adjacent magnets having opposite polarity, each of said magnets of said pulley surface being equally spaced in a circumferential direction from adjacent magnets on said pulley surface, said belt surface having pairs of north and south magnetic poles extending laterally across said belt, said poles being spaced from each other in a longitudinal direction, said north and south magnetic poles on said belt surface being alternately positioned and spaced in a longitudinal direction from each other the same distance as said magnets on said pulley surface, and said magnets on said pulley surface being separated by non-magnetic inserts on said pulley surface.

13. The improvement as defined in claim 12 wherein said pulley comprises a permanent magnet hub integrally formed with said magnets.

References Cited by the Examiner

UNITED STATES PATENTS

| | | | |
|---|---|---|---|
| 493,858 | 3/93 | Edison | 74—229 |
| 996,933 | 7/11 | Lindquist | 74—229 X |
| 2,645,745 | 7/53 | Moreton. | |
| 2,722,617 | 11/55 | Cluwen et al. | |
| 2,959,832 | 11/60 | Baermann. | |
| 2,999,275 | 9/61 | Blume. | |
| 3,026,587 | 3/62 | Spencer | 252—62.5 X |

FOREIGN PATENTS 203,370    9/56    Australia.

DON A. WAITE, *Primary Examiner.*

BROUGHTON G. DURHAM, *Examiner.*